United States Patent
Yamao et al.

(10) Patent No.: US 11,555,114 B2
(45) Date of Patent: Jan. 17, 2023

(54) METHOD FOR PRODUCING POLYCARBONATE RESIN COMPOSITION

(71) Applicant: IDEMITSU KOSAN CO., LTD., Tokyo (JP)

(72) Inventors: Shinobu Yamao, Ichihara (JP); Minoru Yabukami, Ichihara (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 367 days.

(21) Appl. No.: 16/633,129

(22) PCT Filed: Jul. 23, 2018

(86) PCT No.: PCT/JP2018/027522
§ 371 (c)(1),
(2) Date: Jan. 22, 2020

(87) PCT Pub. No.: WO2019/026671
PCT Pub. Date: Feb. 7, 2019

(65) Prior Publication Data
US 2021/0155797 A1    May 27, 2021

(30) Foreign Application Priority Data
Aug. 2, 2017 (JP) .............................. JP2017-150017

(51) Int. Cl.
*C08L 69/00* (2006.01)
*C08K 3/40* (2006.01)
*C08K 7/14* (2006.01)

(52) U.S. Cl.
CPC ................ *C08L 69/00* (2013.01); *C08K 3/40* (2013.01); *C08K 7/14* (2013.01); *C08K 2201/004* (2013.01); *C08K 2201/011* (2013.01)

(58) Field of Classification Search
None
See application file for complete search history.

(56) References Cited

U.S. PATENT DOCUMENTS

| | | | |
|---|---|---|---|
| 2010/0041858 A1* | 2/2010 | Maruyama ............. | C08G 81/00 528/308 |
| 2012/0220737 A1 | 8/2012 | Kato et al. | |
| 2012/0245264 A1* | 9/2012 | Sasaki ..................... | C08L 69/00 524/186 |
| 2018/0118883 A1 | 5/2018 | Tanaka et al. | |

FOREIGN PATENT DOCUMENTS

| | | |
|---|---|---|
| CN | 102712803 A | 10/2012 |
| JP | H02-147624 A | 6/1990 |
| JP | H05-140461 A | 6/1993 |
| JP | H05-171020 A | 7/1993 |
| JP | H08-143760 A | 6/1996 |
| JP | 2012-201832 A | 10/2012 |
| JP | 2012-251013 A | 12/2012 |
| JP | 2016-121275 A | 7/2016 |
| JP | 2017-014368 A | 1/2017 |
| WO | WO-2017/002886 A1 | 1/2017 |
| WO | WO-2017/020185 A1 | 2/2017 |

OTHER PUBLICATIONS

Machine translation of WO 2017/020185 A1 (no date).*
Extended European Search Report dated Apr. 12, 2021 for corresponding European Patent Application No. 18842312.3.
Office Action dated Sep. 28, 2021 issued in a corresponding Japanese Patent Application No. 2019-534047, (7 pages).
International Searching Authority, "International Search Report," issued in connection with International Patent Application No. PCT/JP2018/027522, dated Oct. 23, 2018.
International Searching Authority, "Written Opinion," issued in connection with International Patent Application No. PCT/JP2018/027522, dated Oct. 23, 2018.
Chinese Office Action on CN Appl. Ser. No. 201880050396.7 dated May 13, 2022 with partial Google translation (16 pages).
Office Action issued in corresponding Taiwanese Patent Application No. 107126280, dated Aug. 30, 2022.
Office Action issued in corresponding Chinese Patent Application No. 201880050396.7, dated Oct. 25, 2022.
Office Action issued in corresponding Korean Patent Application No. 10-2020-7002573, dated Nov. 23, 2022.

\* cited by examiner

*Primary Examiner* — Michael J Feely
(74) *Attorney, Agent, or Firm* — Foley & Lardner LLP

(57) ABSTRACT

Provided is a method of producing a polycarbonate-based resin composition, including mixing an aliphatic polycarbonate-based resin (A) containing a specific repeating unit (A-1), and at least one kind of aromatic thermoplastic resin (S) selected from the group consisting of an aromatic polycarbonate-based resin (B) containing a polycarbonate block formed of a specific repeating unit, an aromatic polyester-based resin (C) having a specific structural unit, and a polyarylate resin (D) having a specific structural unit in the presence of a transesterification catalyst at a temperature at which the resin components melt.

14 Claims, No Drawings

METHOD FOR PRODUCING POLYCARBONATE RESIN COMPOSITION

CROSS-REFERENCE TO RELATED APPLICATIONS

The present application claims priority under 37 U.S.C. § 371 to International Patent Application No. PCT/JP2018/027522, filed Jul. 23, 2018, which claims priority to and the benefit of Japanese Patent Application No. 2017-150017, filed on Aug. 2, 2017. The contents of these applications are hereby incorporated by reference in their entireties.

TECHNICAL FIELD

The present invention relates to a method of producing a polycarbonate-based resin composition.

BACKGROUND ART

A molded body formed of a polycarbonate-based resin (hereinafter sometimes abbreviated as PC-based resin) has high transparency, excellent heat resistance, and excellent mechanical strength, such as impact resistance. Accordingly, the molded body has been widely used as an industrial transparent material in the fields of, for example, electricity, machinery, and automobiles. In addition, the molded body is used as a plastic for an optical material in, for example, a lens or an optical disc.

The polycarbonate-based resins may be roughly classified into an aliphatic polycarbonate-based resin and an aromatic polycarbonate-based resin. The aliphatic polycarbonate-based resin has properties such as excellent light fastness, high surface hardness, and excellent chemical resistance (e.g., Patent Document 1). Meanwhile, the aromatic polycarbonate-based resin has properties such as excellent impact resistance and excellent heat resistance (e.g., Patent Document 2).

CITATION LIST

Patent Document

[Patent Document 1] JP 2016-121275 A
[Patent Document 2] JP 2012-251013 A

SUMMARY OF INVENTION

Technical Problem

As described above, the aliphatic polycarbonate-based resin and the aromatic polycarbonate-based resin each have excellent properties. However, when the resins are mixed, there is a problem in that the transparency of the resultant resin composition reduces. When an aromatic polyester-based resin having excellent chemical resistance or a polyarylate resin excellent in heat resistance and weatherability is mixed as a transparent thermoplastic resin with the aliphatic polycarbonate-based resin, there is similarly a problem in that the transparency of the resultant resin composition reduces.

Accordingly, it has been required to obtain a polycarbonate-based resin composition having the following feature: when the aliphatic polycarbonate-based resin, and the aromatic polycarbonate-based resin, the aromatic polyester-based resin, and/or the polyarylate resin are mixed, the composition maintains high transparency inherent in any such polycarbonate-based resin while having the excellent properties of the respective resins.

Solution to Problem

The inventors of the present invention have made extensive investigations with a view to achieving the object, and as a result, have found that the object is achieved by melting and kneading an aliphatic polycarbonate-based resin, and an aromatic polycarbonate-based resin, an aromatic polyester-based resin, and/or a polyarylate resin under a specific condition.

That is, the present invention provides the following items [1] to [15].

[1] A method of producing a polycarbonate-based resin composition, comprising mixing: an aliphatic polycarbonate-based resin (A) containing a repeating unit (A-1) represented by the following general formula (I); and at least one kind of aromatic thermoplastic resin (S) selected from the group consisting of an aromatic polycarbonate-based resin (B) containing a polycarbonate block formed of a repeating unit represented by the following general formula (II), an aromatic polyester-based resin (C) having a structural unit represented by the following general formula (III), and a polyarylate resin (D) having a structural unit represented by the following general formula (IV) in the presence of a transesterification catalyst at a temperature equal to or more than a temperature at which the resin components melt:

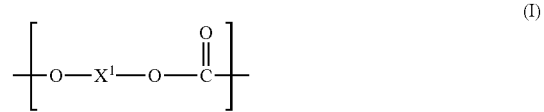

wherein $X^1$ represents a divalent aliphatic hydrocarbon group having 2 to 20 carbon atoms, or a divalent alicyclic hydrocarbon group having 4 to 22 carbon atoms, and the divalent aliphatic hydrocarbon group and the divalent alicyclic hydrocarbon group may each contain at least one heteroatom selected from an oxygen atom, a nitrogen atom, and a sulfur atom, and/or at least one halogen atom selected from a fluorine atom, a chlorine atom, a bromine atom, and an iodine atom;

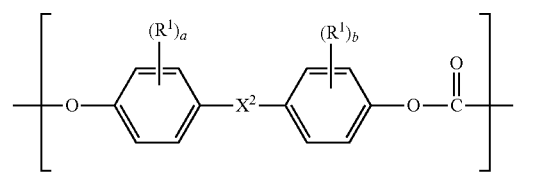

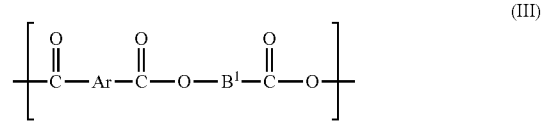

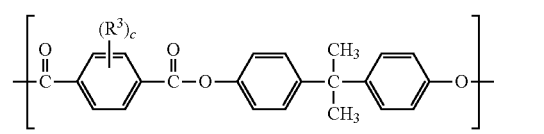

wherein $R^1$ and $R^2$ each independently represent a halogen atom, an alkyl group having 1 to 6 carbon atoms, or an alkoxy group having 1 to 6 carbon atoms, and a plurality of $R^1$s or $R^2$s may be identical to or different from each other, $X^2$ represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, Ar represents a phenylene group, a naphthylene group, or a biphenylylene group, $B^1$ represents $C_nH_{2n}$ where "n" represents from 2 to 4, $R^3$ is selected from the group consisting of a hydrogen atom, a halogen atom, a trifluoromethyl group, an alkyl group having 1 to 12 carbon atoms, a substituted or unsubstituted aryl group having 6 to 12 carbon atoms, an alkoxy group having 1 to 12 carbon atoms, and a substituted or unsubstituted aryloxy group having 6 to 12 carbon atoms, and a plurality of $R^3$s may be identical to or different from each other, and "a", "b", and "c" each independently represent an integer of from 0 to 4.

[2] The method of producing a polycarbonate-based resin composition according to the above-mentioned item [1], wherein the aromatic thermoplastic resin (S) is the aromatic polycarbonate-based resin (B) containing the polycarbonate block formed of the repeating unit represented by the general formula (II).

[3] The method of producing a polycarbonate-based resin composition according to the above-mentioned item [1] or [2], wherein the aliphatic polycarbonate-based resin (A) contains, as the repeating unit (A-1), one or more selected from the group consisting of repeating units represented by the following general formulae (I-1), (I-2), and (I-3).

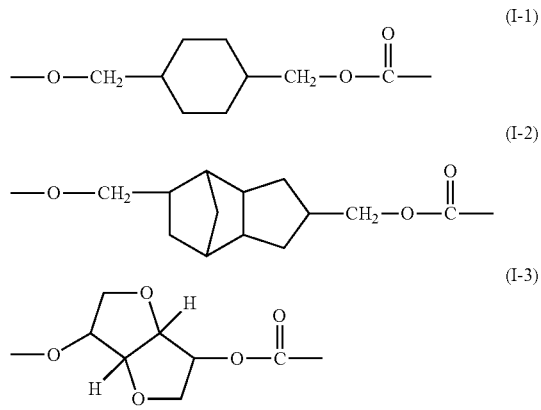

[4] The method of producing a polycarbonate-based resin composition according to the above-mentioned item [3], wherein the aliphatic polycarbonate-based resin (A) contains, as the repeating unit (A-1), the repeating unit represented by the general formula (I-3).

[5] The method of producing a polycarbonate-based resin composition according to the above-mentioned item [3] or [4], wherein a ratio of the repeating unit represented by the general formula (I-3) in the repeating unit (A-1) is 40 mol % or more.

[6] The method of producing a polycarbonate-based resin composition according to any one of the above-mentioned items [1] to [5], wherein the aliphatic polycarbonate-based resin (A) is mixed at 60 mass % or more and 95 mass % or less with respect to 100 mass % of a total of the aliphatic polycarbonate-based resin (A) and the aromatic thermoplastic resin (S).

[7] The method of producing a polycarbonate-based resin composition according to any one of the above-mentioned items [1] to [6], wherein the transesterification catalyst comprises at least one kind selected from the group consisting of a metal oxide, an alkali metal compound, an alkaline earth metal compound, a nitrogen-containing compound, and a phosphorus-containing compound.

[8] The method of producing a polycarbonate-based resin composition according to any one of the above-mentioned items [1] to [7], wherein the polycarbonate-based resin composition has a refractive index of 1.50 or more and 1.55 or less for light having a wavelength of 589.3 nm.

[9] The method of producing a polycarbonate-based resin composition according to any one of the above-mentioned items [1] to [8], further comprising adding a glass filler (E) at a ratio of 5 mass % or more and 50 mass % or less in 100 mass % of a total amount of the polycarbonate-based resin composition.

[10] The method of producing a polycarbonate-based resin composition according to the above-mentioned item [9], wherein the glass filler (E) comprises at least one kind selected from the group consisting of glass fibers, glass powder, a glass flake, milled fibers, a glass cloth, and glass beads.

[11] The method of producing a polycarbonate-based resin composition according to the above-mentioned item [9] or [10], wherein the glass filler (E) has a refractive index of 1.50 or more and 1.55 or less for light having a wavelength of 589.3 nm.

[12] The method of producing a polycarbonate-based resin composition according to any one of the above-mentioned items [9] to [11], wherein a difference between a refractive index of a mixture of the aliphatic polycarbonate-based resin (A) and the aromatic thermoplastic resin (S) for light having a wavelength of 589.3 nm, and a refractive index of the glass filler (E) therefor is 0.020 or less.

[13] A method of producing a molded article of a polycarbonate-based resin composition, comprising molding a polycarbonate-based resin composition obtained by the production method of any one of the above-mentioned items [1] to [12].

[14] The method of producing a molded article according to the above-mentioned item [13], wherein the molded article has a haze of 10 or less when produced to have a thickness of 2 mm.

[15] The method of producing a molded article according to the above-mentioned item [13] or [14], wherein the molded article has a total light transmittance of 80% or more when produced to have a thickness of 2 mm.

Advantageous Effects of Invention

According to the present invention, the polycarbonate-based resin composition having the following feature can be produced: while the composition has the excellent properties of each of the aliphatic polycarbonate-based resin, and at least one kind of thermoplastic resin selected from the aromatic polycarbonate-based resin, the aromatic polyester-based resin, and the polyarylate resin, the composition maintains high transparency inherent in any such polycarbonate-based resin.

DESCRIPTION OF EMBODIMENTS

A method of producing a polycarbonate-based resin composition of the present invention is described in detail below.

The term "XX to YY" as used herein means "XX or more and YY or less." In this description, a specification considered to be preferred may be arbitrarily adopted, and a combination of preferred specifications is more preferred.

A method of producing a polycarbonate-based resin composition of the present invention includes mixing an aliphatic polycarbonate-based resin (A) containing a specific repeating unit, and at least one kind of aromatic thermoplastic resin (S) selected from the group consisting of an aromatic polycarbonate-based resin (B) containing a polycarbonate block formed of a specific repeating unit, an aromatic polyester-based resin (C) having a specific structural unit, and a polyarylate resin (D) having a specific structural unit in the presence of a transesterification catalyst at a temperature equal to or more than a temperature at which the resin components melt.

<Aliphatic Polycarbonate-Based Resin (A)>

The aliphatic polycarbonate-based resin (A) to be used in the production method of the present invention needs to contain a repeating unit (A-1) represented by the following general formula (I):

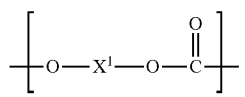

(I)

wherein $X^1$ represents a divalent aliphatic hydrocarbon group having 2 to 20 carbon atoms, or a divalent alicyclic hydrocarbon group having 4 to 22 carbon atoms, and the divalent aliphatic hydrocarbon group and the divalent alicyclic hydrocarbon group may each contain at least one heteroatom selected from an oxygen atom, a nitrogen atom, and a sulfur atom, and/or at least one halogen atom selected from a fluorine atom, a chlorine atom, a bromine atom, and an iodine atom.

The divalent alicyclic hydrocarbon group containing a heteroatom in $X^1$ is, for example, a divalent saturated heterocyclic group that has 4 to 20 carbon atoms and contains oxygen or nitrogen.

Specific examples of the divalent group represented by $X^1$ include divalent groups each obtained by removing two hydroxyl groups from an aliphatic dihydroxy compound to be described later. Among them, a divalent residue obtained by removing two hydroxyl groups from an aliphatic dihydroxy compound represented by the general formula (11) to be described later is preferred.

More specifically, the aliphatic polycarbonate-based resin (A) preferably has, as the repeating unit (A-1), one or more selected from the group consisting of repeating units represented by the following general formulae (I-1), (I-2), and (I-3) from the viewpoint of its heat resistance (high glass transition temperature).

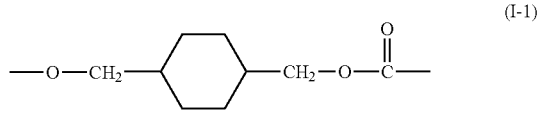

(I-1)

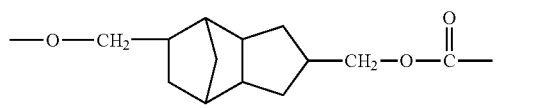

(I-2)

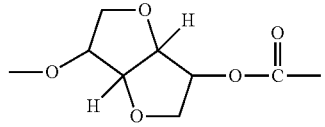

(I-3)

The aliphatic polycarbonate-based resin (A) more preferably contains at least the repeating unit represented by the general formula (I-3) as the repeating unit (A-1) from the viewpoint of the heat resistance (high glass transition temperature). For example, the resin may contain only the repeating unit represented by the general formula (I-3) as the repeating unit (A-1). Alternatively, the resin may contain a combination of the repeating unit represented by the general formula (I-3) and any repeating unit represented by the general formula (I-1) or (I-2), or a combination of the repeating unit represented by the general formula (I-3), and the repeating units represented by the general formulae (I-1) and (I-2).

The total content of the repeating units represented by the general formula (I-1), the general formula (I-2), and/or the general formula (I-3) in the repeating unit (A-1) is preferably 80 mol % or more, more preferably 90 mol % or more, still more preferably 100 mol %. The ratio of the repeating unit represented by the general formula (I-3) among them in the repeating unit (A-1) is preferably 40 mol % or more, more preferably 45 mol % or more, still more preferably 50 mol % or more from the viewpoint of the heat resistance (high glass transition temperature). When the ratio of the repeating unit represented by the general formula (I-3) is 40 mol % or more, a polycarbonate-based resin composition that is more excellent in light fastness and heat resistance can be obtained.

The aliphatic polycarbonate-based resin (A) containing the repeating unit (A-1) represented by the general formula (I) is derived from an aliphatic dihydroxy compound. The aliphatic dihydroxy compound is, for example, a compound represented by the following general formula (11). The aliphatic dihydroxy compounds may be used alone or in combination thereof.

(11)

wherein in the general formula (11), $R^{11}$ represents an alkylene group having 2 to 18, preferably 2 to 10, more preferably 3 to 6 carbon atoms, a cycloalkylene group having 4 to 20, preferably 5 to 20 carbon atoms, or a divalent oxygen- or nitrogen-containing saturated heterocyclic group having 4 to 20, preferably 5 to 20 carbon atoms, and may contain at least one heteroatom selected from an oxygen atom, a nitrogen atom, and a sulfur atom, and at least one halogen atom selected from a fluorine atom, a chlorine atom, a bromine atom, and an iodine atom, and "t" represents an integer of 0 or 1.

Examples of the alkylene group having 2 to 18 carbon atoms include an ethylene group, a n-propylene group, an isopropylene group, a n-butylene group, an isobutylene group, a n-pentylene group, a n-hexylene group, a n-heptylene group, a n-octylene group, a 2-ethylhexylene group, a n-nonylene group, a n-decylene group, a n-undecylene group, a n-dodecylene group, a n-tridecylene group, a n-tetradecylene group, a n-pentadecylene group, a n-hexadecylene group, a n-heptadecylene group, and a n-octadecylene group. Examples of the cycloalkylene group having 4 to 20 carbon atoms include a cyclopentylene group, a cyclohexylene group, a cyclooctylene group, a cyclodecylene group, a cyclotetradecylene group, an adamantylene group, a bicycloheptylene group, a bicyclodecylene group, and a tricyclodecylene group.

Examples of the aliphatic dihydroxy compound include: dihydroxy compounds each having a chain aliphatic hydrocarbon group, such as ethylene glycol, 1,3-propanediol, 1,2-propanediol, 1,4-butanediol, 1,5-pentanediol, 1,6-hexanediol, 1,7-heptanediol, 1,8-octanediol, 1,10-decanediol, 2,2-dimethylpropane-1,3-diol, diethylene glycol, triethylene glycol, tetraethylene glycol, octaethylene glycol, dipropylene glycol, N-methyldiethanolamine, and p-xylylene glycol; dihydroxy compounds each having an alicyclic hydrocarbon group, such as 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 2,6-decalindiol, 1,5-decalindiol, 2,3-decalindiol, 2,6-decalindimethanol, 1,5-decalindimethanol, 2,3-decalindimethanol, 2,3-norbornanediol, 2,5-norbornanediol, 2,3-norbornanedimethanol, 2,5-norbornanedimethanol, 2,2-bis(4-hydroxycyclohexyl)-propane, 1,3-adamantanediol, 1,3-adamantanedimethanol, and tricyclodecanedimethanol; condensed polycyclic ether diols, such as isosorbide; heterocyclic spiro compounds, such as cyclic ether diols, including 3,9-bis(2-hydroxyethyl)-2,4,8,10-tetraoxaspiro[5.5]undecane, 3,9-bis(2-hydroxy-1,1-dimethylethyl)-2,4,8,10-tetraoxaspiro[5.5]undecane, 3,9-bis(2-hydroxy-1,1-diethylethyl)-2,4,8,10-tetraoxaspiro[5.5]undecane, 3,9-bis(2-hydroxy-1,1-dipropylethyl)-2,4,8,10-tetraoxaspiro[5.5]undecane, and 1,4-anhydroerythritol; cyclic acetal diols, such as 2-(5-ethyl-5-hydroxymethyl-1,3-dioxan-2-yl)-2-methylpropan-1-ol; N-heterocyclic diols, such as 3,4-pyrrolidinediol, 3,4-dimethylpiperidinediol, N-ethyl-3,4-piperidinediol, and N-ethyl-3,5-piperidinediol; and S-heterocyclic diols, such as deoxythiofructose.

Among those aliphatic dihydroxy compounds, 1,4-cyclohexanedimethanol, tricyclodecanedimethanol, 1,3-adamantanedimethanol, 2,2-bis(4-hydroxycyclohexyl)-propane, 3,9-bis(2-hydroxy-1,1-dimethylethyl)-2,4,8,10-tetraoxaspiro[5.5]undecane, 2-(5-ethyl-5-hydroxymethyl-1,3-dioxan-2-yl)-2-methylpropan-1-ol, isosorbide, 1,3-propanediol, 1,4-butanediol, and 1,6-hexanediol are preferred from the viewpoints of ease in production, properties, and the variety of applications. Among them, 1,4-cyclohexanedimethanol, tricyclodecanedimethanol, and isosorbide are more preferred from the viewpoints of heat resistance and a refractive index.

A method of purifying the aliphatic dihydroxy compound is not particularly limited. The compound may be preferably purified by any one of simple distillation, rectification, and recrystallization, or a combination of two or more of these approaches. It should be noted that a commercial product of the aliphatic dihydroxy compound contains a stabilizer or a deterioration product produced during its storage in some cases, and such content may adversely affect the quality of the polymer. When the polymer is obtained by using the aliphatic dihydroxy compound, it is preferred that the compound be purified again and used in a polymerization reaction immediately thereafter. When it is inevitable that the compound is stored after purification for a while before its use, the compound is preferably stored under a dry, light-shielded, and inert gas atmosphere having a temperature as low as 40° C. or less before the use.

The viscosity-average molecular weight of the aliphatic polycarbonate-based resin (A) is preferably from 10,000 to 50,000. When the viscosity-average molecular weight falls within the range, balance between its mechanical properties and flowability is more excellent. The viscosity-average molecular weight is more preferably from 12,000 to 35,000, still more preferably from 15,000 to 22,000. The viscosity-average molecular weight (Mv) is calculated from the following Schnell's equation by using a limiting viscosity [η] determined through the measurement of the viscosity of a methylene chloride solution (concentration: g/L) at 20° C. with an Ubbelohde-type viscometer.

$$[\eta]=1.23\times10^{-5}\times Mv^{0.83}$$ [Math. 1]

The refractive index of the aliphatic polycarbonate-based resin (A) for light having a wavelength of 589.3 nm is preferably 1.480 or more and 1.520 or less, more preferably 1.500 or more and 1.519 or less, still more preferably 1.501 or more and 1.516 or less.

The glass transition temperature of the aliphatic polycarbonate-based resin (A) is preferably from 75° C. to 200° C., more preferably from 80° C. to 180° C., still more preferably from 100° C. to 150° C. When the glass transition temperature of the aliphatic polycarbonate-based resin (A) is 75° C. or more, it becomes easier to develop the resin into a wide variety of applications. When the glass transition temperature of the aliphatic polycarbonate-based resin (A) is 200° C. or less, the resin is excellent in melt flowability at the time of its molding, and hence it becomes easier to mold the resin in a temperature range where a reduction in strength of the resin serving as a polymer due to the heat deterioration of the polymer and the coloring thereof are suppressed.

A method of producing the aliphatic polycarbonate-based resin (A) is not particularly limited. Examples thereof may include an interfacial polycondensation method and a melting method (ester exchange method). In the present invention, an aliphatic polycarbonate-based resin produced by the ester exchange method is preferably used. For example, a polycarbonate-based resin may be obtained by subjecting a dihydroxy compound and a carbonic acid diester to an ester exchange reaction through the use of a chain-end terminator, a branching agent, or the like as required. Specifically, the reaction only needs to be advanced in conformity with a known ester exchange method. As an example, the resin may be produced by using conditions described in JP 6131264 B2.

[Aromatic Thermoplastic Resin (S)]

The aromatic thermoplastic resin (5) to be mixed with the aliphatic polycarbonate-based resin (A) is described in detail below.

<Aromatic Polycarbonate-Based Resin (B)>

The main chain of the aromatic polycarbonate-based resin (B) has a repeating unit represented by the following general formula (II). The polycarbonate-based resin is not particularly limited, and various known polycarbonate-based resins may each be used. For example, the aromatic polycarbonate-based resin (B) may be a homopolycarbonate resin.

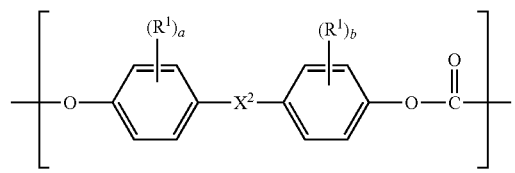

(II)

wherein $R^1$ and $R^2$ each independently represent a halogen atom, an alkyl group having 1 to 6 carbon atoms, or an alkoxy group having 1 to 6 carbon atoms, and a plurality of $R^1$s or $R^2$s may be identical to or different from each other, $X^2$ represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, and "a" and "b" each independently represent an integer of from 0 to 4.

In the general formula (I), examples of the halogen atom that $R^1$ and $R^2$ each independently represent include a fluorine atom, a chlorine atom, a bromine atom, and an iodine atom.

Examples of the alkyl group that $R^1$ and $R^2$ each independently represent include a methyl group, an ethyl group, a n-propyl group, an isopropyl group, various butyl groups (the term "various" means that a linear group and various branched groups are included, and the same holds true for the following in this description), various pentyl groups, and various hexyl groups. Examples of the alkoxy group that $R^1$ and $R^2$ each independently represent include groups having the alkyl groups as alkyl group moieties.

Examples of the alkylene group represented by $X^2$ include a methylene group, an ethylene group, a trimethylene group, a tetramethylene group, and a hexamethylene group, and an alkylene group having 1 to 5 carbon atoms is preferred. Examples of the alkylidene group represented by $X^2$ include an ethylidene group and an isopropylidene group. Examples of the cycloalkylene group represented by $X^2$ include a cyclopentanediyl group, a cyclohexanediyl group, and a cyclooctanediyl group, and a cycloalkylene group having 5 to 10 carbon atoms is preferred. Examples of the cycloalkylidene group represented by $X^2$ include a cyclohexylidene group, a 3,5,5-trimethylcyclohexylidene group, and a 2-adamanthylidene group, and a cycloalkylidene group having 5 to 10 carbon atoms is preferred, and a cycloalkylidene group having 5 to 8 carbon atoms is more preferred. Examples of the aryl moiety of the arylalkylene group represented by $X^2$ include aryl groups each having 6 to 14 ring-forming carbon atoms, such as a phenyl group, a naphthyl group, a biphenyl group, and an anthryl group, and examples of the alkylene moiety thereof include the above-mentioned alkylene groups. Examples of the aryl moiety of the arylalkylidene group represented by $X^2$ include aryl groups each having 6 to 14 ring-forming carbon atoms, such as a phenyl group, a naphthyl group, a biphenyl group, and an anthryl group, and examples of the alkylidene moiety thereof may include the above-mentioned alkylidene groups.

Reference symbols "a" and "b" each independently represent an integer of from 0 to 4, preferably from 0 to 2, more preferably 0 or 1.

Among such repeating units, a repeating unit in which "a" and "b" each represent 0, and $X^2$ represents a single bond or an alkylene group having 1 to 8 carbon atoms, or a repeating unit in which "a" and "b" each represent 0, and $X^2$ represents an alkylene group having 3 carbon atoms, in particular, an isopropylidene group is suitable.

Specifically, a resin obtained by such a conventional polycarbonate production method as described below may be used as the aromatic polycarbonate-based resin (B): an interfacial polymerization method involving causing a dihydric phenol-based compound and phosgene to react with each other in the presence of an organic solvent inert to the reaction and an alkali aqueous solution, and then adding a polymerization catalyst, such as a tertiary amine or a quaternary ammonium salt, to the resultant to polymerize the resultant; or a pyridine method involving dissolving the dihydric phenol-based compound in pyridine or a mixed solution of pyridine and an inert solvent, and introducing phosgene into the solution to directly produce the resin.

At the time of the reaction, a molecular weight modifier (chain-end terminator), a branching agent, or the like is used as required.

The dihydric phenol-based compound is, for example, a compound represented by the following general formula (II');

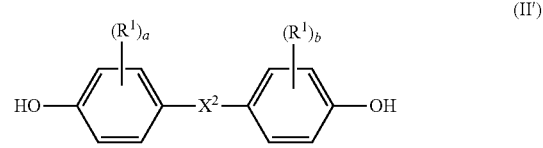

wherein $R^1$, $R^2$, $X^2$, "a", and "b" are as defined above, and preferred examples thereof are the same as those described above.

Specific examples of the dihydric phenol-based compound include: bis(hydroxyphenyl)alkane-based dihydric phenols, such as 2,2-bis(4-hydroxyphenyl)propane [bisphenol A], bis(4-hydroxyphenyl)methane, 1,1-bis(4-hydroxypheny)ethane, and 2,2-bis(4-hydroxy-3,5-dimethylphenyl)propane; and 4,4'-dihydroxydiphenyl, a bis(4-hydroxyphenyl)cycloalkane, bis(4-hydroxyphenyl) oxide, bis(4-hydroxyphenyl) sulfide, bis(4-hydroxyphenyl) sulfone, bis(4-hydroxyphenyl) sulfoxide, and bis(4-hydroxyphenyl) ketone. Those dihydric phenols may be used alone or as a mixture thereof.

Among them, bis(hydroxyphenyl)alkane-based dihydric phenols are preferred, and bisphenol A is more preferred. When bisphenol A is used as the dihydric phenol, an aromatic PC resin satisfying the following conditions is obtained: in the general formula (i), $X^2$ represents an isopropylidene group, and a=b=0.

Examples of the dihydric phenol except bisphenol A include bis(hydroxyaryl)alkanes, bis(hydroxyaryl)cycloalkanes, dihydroxyaryl ethers, dihydroxydiaryl sulfides, dihydroxydiaryl sulfoxides, dihydroxydiaryl sulfones, dihydroxydiphenyls, dihydroxydiaryl fluorenes, and dihydroxydiaryl adamantanes. Those dihydric phenols may be used alone or as a mixture thereof.

Examples of the bis(hydroxyaryl)alkanes include bis(4-hydroxyphenyl)methane, 1,1-bis(4-hydroxyphenyl)ethane, 2,2-bis(4-hydroxyphenyl)butane, 2,2-bis(4-hydroxyphenyl)octane, bis(4-hydroxyphenyl)phenylmethane, bis(4-hydroxyphenyl)diphenylmethane, 2,2-bis(4-hydroxy-3-methylphenyl)propane, bis(4-hydroxyphenyl)naphthylmethane, 1,1-bis(4-hydroxy-3-tert-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, and 2,2-bis(4-hydroxy-3,5-dibromophenyl)propane.

Examples of the bis(hydroxyaryl)cycloalkanes include 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane, and 1,1-bis(4-hydroxyphenyl)cyclododecane. Examples of the dihydroxyaryl ethers include 4,4'-dihydroxydiphenyl ether and 4,4'-dihydroxy-3,3'-dimethylphenyl ether.

Examples of the dihydroxydiaryl sulfides include 4,4'-dihydroxydiphenyl sulfide and 4,4'-dihydroxy-3,3'-dimethyldiphenyl sulfide. Examples of the dihydroxydiaryl sulfoxides include 4,4'-dihydroxydiphenyl sulfoxide and 4,4'-dihydroxy-3,3'-dimethyldiphenyl sulfoxide. Examples of the dihydroxydiaryl sulfones include 4,4'-dihydroxydiphenyl sulfone and 4,4'-dihydroxy-3,3'-dimethyldiphenyl sulfone.

An example of the dihydroxydiphenyls is 4,4'-dihydroxydiphenyl. Examples of the dihydroxydiaryl fluorenes include 9,9-bis(4-hydroxyphenyl)fluorene and 9,9-bis(4-hydroxy-3-methylphenyl)fluorene. Examples of the dihydroxydiaryl adamantanes include 1,3-bis(4-hydroxypheny)adamantane, 2,2-bis(4-hydroxyphenyl)adamantane, and 1,3-bis(4-hydroxyphenyl)-5,7-dimethyladamantane.

Examples of the dihydric phenol except the above-mentioned compounds include 4,4'-[1,3-phenylenebis(1-methylethylidene)]bisphenol, 10,10-bis(4-hydroxyphenyl)-9-anthrone, and 1,5-bis(4-hydroxyphenylthio)-2,3-dioxapentane.

A chain-end terminator (molecular weight modifier) may be used for adjusting the molecular weight of the aromatic polycarbonate resin (B). Examples of the chain-end terminator may include monohydric phenols, such as phenol, p-cresol, p-tert-butylphenol, p-tert-octylphenol, p-cumylphenol, p-nonylphenol, m-pentadecylphenol, and p-tert-amylphenol. Those monohydric phenols may be used alone or in combination thereof.

<Aromatic Polyester-Based Resin (C)>

The aromatic polyester-based resin (C) contains a repeating unit represented by the following general formula (III):

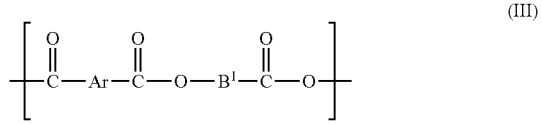

(III)

wherein Ar represents a phenylene group, a naphthylene group, or a biphenylylene group, and $B^1$ represents $C_nH_{2n}$ where "n" represents from 2 to 4, The aromatic polyester-based resin (C) may be, for example, a resin obtained from an aromatic polycarboxylic acid and an aliphatic polyol.

Examples of the aromatic polycarboxylic acid may include aromatic polycarboxylic acids, such as o-phthalic acid, isophthalic acid, terephthalic acid, 1,4-naphthalenedicarboxylic acid, 2,3-naphthalenedicarboxylic acid, 2,6-naphthalenedicarboxylic acid, biphenyldicarboxylic acid, trimellitic acid, and pyromellitic acid, and anhydrides or ester derivatives thereof. The aromatic polycarboxylic acids may be used alone or in combination thereof.

Examples of the aliphatic polyol may include ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, 2,3-butanediol, trimethylolpropane, ditrimethylolpropane, and tritrimethylolpropane.

As an example of the aromatic polyester-based resin (C), a resin in a form of a polycondensate of; an aromatic dicarboxylic acid, such as phthalic acid, isophthalic acid, or terephthalic acid, or an ester derivative of an aromatic dicarboxylic acid, such as 2,6-naphthalenedicarboxylic acid dimethyl ester; and an aliphatic diol, such as ethylene glycol, diethylene glycol, propylene glycol, 1,4-butanediol, 1,3-butanediol, 2,3-butanediol, dipropylene glycol, or triethylene glycol, is more preferably used. For example, at least one kind of polyethylene terephthalate (PET), polybutylene terephthalate (PBT), and polyethylene naphthalate (PEN) is preferably used as the aromatic polyester-based resin (C).

<Polyarylate Resin (D)>

The polyarylate resin (D) has a repeating unit represented by the following general formula (IV);

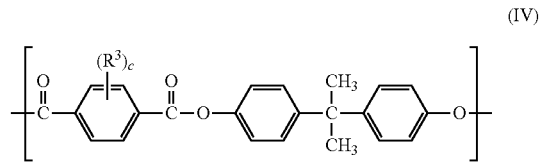

(IV)

wherein $R^3$ is selected from the group consisting of a hydrogen atom, a halogen atom, a trifluoromethyl group, an alkyl group having 1 to 12 carbon atoms, a substituted or unsubstituted aryl group having 6 to 12 carbon atoms, an alkoxy group having 1 to 12 carbon atoms, and a substituted or unsubstituted aryloxy group having 6 to 12 carbon atoms, and a plurality of $R^3$s may be identical to or different from each other, and "c" represents an integer of from 0 to 4.

Examples of the halogen atom represented by $R^3$ include a fluorine atom, a chlorine atom, a bromine atom, and an iodine atom.

Examples of the alkyl group represented by $R^3$ include a methyl group, an ethyl group, a n-propyl group, an isopropyl group, various butyl groups, various pentyl groups, and various hexyl groups. Examples of the alkoxy group represented by $R^3$ include groups having the alkyl groups as alkyl group moieties. Examples of the aryl group represented by $R^3$ include aryl groups each having 6 to 14 ring-forming carbon atoms, such as a phenyl group, a naphthyl group, a biphenyl group, and an anthryl group.

Reference symbol "c" represents an integer of preferably from 0 to 3, more preferably from 0 to 2. When reference symbol "c" represents more than 1, that is, when a plurality of $R^3$s exist, the plurality of $R^3$s may be identical to or different from each other.

<Resin Mixing Ratio>

In the production method of the present invention, it is preferred that the aliphatic polycarbonate-based resin (A) be mixed at 60 mass % or more and 95 mass % or less with respect to 100 mass % of a total of the aliphatic polycarbonate-based resin (A) and the aromatic thermoplastic resin (S). When the ratio of the aliphatic polycarbonate-based resin (A) falls within the range, even in the case where the resin is mixed with the aromatic thermoplastic resin (S), a polycarbonate-based resin excellent in transparency can be more easily obtained. The ratio of the aliphatic polycarbonate-based resin (A) with respect to 100 mass % of the total of the aliphatic polycarbonate-based resin (A) and the aromatic thermoplastic resin (S) is more preferably 65 mass % or more and 90 mass % or less, still more preferably 70 mass % or more and 85 mass % or less. In addition, in one aspect of the present invention, the aromatic thermoplastic resin (S) is preferably the aromatic polycarbonate-based resin (B) containing the polycarbonate block formed of the repeating unit represented by the general formula (II) from the viewpoint of its heat resistance (glass transition temperature: Tg).

<Transesterification Catalyst>

At least one kind selected from the group consisting of a metal oxide, an alkali metal compound, an alkaline earth metal compound, a nitrogen-containing compound, and a phosphorus-containing compound may be preferably used as the transesterification catalyst to be used in the production method of the present invention.

Examples of the metal oxide include zinc oxide, tin oxide, iron oxide, zirconium oxide, and lead oxide from the viewpoints of the ease of availability of a raw material therefor and its safety. Among them, zinc oxide is preferred.

Examples of the alkali metal compound include a hydroxide, an inorganic salt, an organic salt, a halide, and a hydride of an alkali metal. Examples of the alkaline earth metal compound include a hydroxide, an inorganic salt, an organic salt, a halide, and a hydride of an alkaline earth metal. Examples of the nitrogen-containing compound include amines. Examples of the phosphorus-containing compound include various phosphonium salts. More specific examples thereof include sodium hydroxide, potassium hydroxide, cesium hydroxide, barium hydroxide, calcium hydroxide, magnesium hydroxide, lithium carbonate, sodium carbonate, potassium carbonate, cesium carbonate, barium carbonate, calcium carbonate, magnesium carbonate, lithium fluoride, sodium fluoride, potassium fluoride, cesium fluoride, tertiary amines (e.g., triethylamine and triphenylamine), tetraphenylphosphonium bromide, and tetraphenylphosphonium chloride.

The addition amount of the transesterification catalyst is not particularly limited. The amount is preferably 300 ppm by mass or less, more preferably 100 ppm by mass or less, still more preferably 50 ppm by mass or less with respect to the mixture of the aliphatic polycarbonate-based resin (A) and the aromatic thermoplastic resin (S) from the viewpoint that there is no risk of the remaining of a catalyst residue in the polycarbonate-based resin composition, and hence the performance of the product can be further improved.

<Melting and Kneading Conditions>

In the method of producing a polycarbonate-based resin composition of the present invention, the aliphatic polycarbonate-based resin (A) and the aromatic thermoplastic resin (S) are mixed (melted and kneaded) in the presence of the transesterification catalyst at a temperature equal to or more than the temperature at which the resin components melt.

The melting and kneading may be performed by a method that has been typically used, such as a method involving using a ribbon blender, a Henschel mixer, a Banbury mixer, a drum tumbler, a single-screw extruder, a twin-screw extruder, a co-kneader, or a multi-screw extruder. A heating temperature at the time of the melting and kneading is appropriately selected from the range of typically from about 150° C. to about 300° C., preferably from about 220° C. to about 300° C.

A heating and melting time, which is not particularly limited, is, for example, 1 minute or more and 30 minutes or less, preferably 2 minutes or more and 15 minutes or less.

The production method of the present invention enables the production of a polycarbonate-based resin composition having a refractive index of preferably 1.50 or more and 1.55 or less for light having a wavelength of 589.3 nm. The method enables the production of a polycarbonate-based resin composition having a refractive index of more preferably 1.505 or more and 1.54 or less, still more preferably 1.510 or more and 1.535 or less for light having a wavelength of 589.3 nm. When the refractive index falls within the range, more excellent transparency can be obtained through combination with glass fibers to be described later.

<Other Additives>

In the production method of the present invention, a known additive may be blended in accordance with applications and requirements. Examples of the additive include various fillers, an antioxidant, a heat stabilizer, a plasticizer, a light stabilizer, a polymerization metal deactivator, a flame retardant, a lubricant, an antistatic agent, a surfactant, an antimicrobial agent, a UV absorber, and a release agent.

In the method of producing a polycarbonate-based resin composition of the present invention, a glass filler (E) is preferably blended from the viewpoint of further strengthening the mechanical properties of the resin composition to be obtained.

Fillers using alkali glass, low-alkali glass, non-alkali glass, and the like as raw materials may each be suitably used as the glass filler (E). The shape of the glass filler (E) is not particularly limited, and for example, at least one kind selected from the group consisting of glass fibers, glass powder, a glass flake, milled fibers, a glass cloth, and glass beads may be used.

The refractive index of the glass filler (E) for light having a wavelength of 589.3 nm is preferably 1.50 or more and 1.55 or less. When the refractive index of the glass filler (E) for light having a wavelength of 589.3 nm falls within the range, even in the case where such filler is blended, a polycarbonate-based resin composition that is more excellent in transparency can be produced. The refractive index of the glass filler (E) for light having a wavelength of 589.3 nm is more preferably 1.505 or more and 1.540 or less, still more preferably 1.510 or more and 1.535 or less.

Although the refractive index of the glass filler (E) at any other wavelength is not particularly limited, the following ranges may be given as examples: the refractive index thereof for light having a wavelength of 486.1 nm is preferably 1.500 or more and 1.560 or less, more preferably 1.510 or more and 1.55 or less, still more preferably 1.515 or more and 1.550 or less; and the refractive index thereof for light having a wavelength of 656.3 nm is preferably 1.500 or more and 1.551 or less, more preferably 1.505 or more and 1.540 or less.

Although the blending amount of the glass filler (E) is not particularly limited, for example, the filler is preferably added at a ratio of 5 mass % or more and 50 mass % or less in 100 mass % of the total amount of the polycarbonate-based resin composition containing the aliphatic polycarbonate-based resin (A), the aromatic thermoplastic resin (5), and the transesterification catalyst described above. When the blending amount of the glass filler (E) falls within the range, a polycarbonate-based resin composition that has higher mechanical characteristics and is excellent in transparency can be produced. The glass filler (E) is blended at a ratio of more preferably 8 mass % or more and 40 mass % or less, still more preferably 10 mass % or more and 35 mass % or less in 100 mass % of the total amount of the polycarbonate-based resin composition.

The glass filler to be preferably used in the present invention is commercially available as S-2 GLASS FIBER (manufactured by Sakai Sangyo Co., Ltd.) or T-GLASS YARN (manufactured by Soyo Co., Ltd.). In the method of producing a polycarbonate-based resin composition of the present invention, a glass filler using E-glass as a raw material, such as MA-409C (manufactured by Asahi Fiber Glass Co., Ltd.), is not suitable in terms of refractive index.

In the method of producing a polycarbonate-based resin composition of the present invention, a difference between the refractive index of the mixture of the aliphatic polycarbonate-based resin (A) and the aromatic thermoplastic resin (5) that are the resin components for light having a wavelength of 589.3 nm, and the refractive index of the glass filler (E) therefor is preferably 0.020 or less. When the refractive index difference falls within the range, high transparency of the resin composition to be obtained can be maintained. The refractive index difference is more preferably 0.010 or less, still more preferably 0.005 or less, particularly preferably 0.003 or less.

[Method of Producing Molded Article]

In the present invention, a molded article of the above-mentioned polycarbonate-based resin composition may be produced by, for example, an injection molding method, an injection compression molding method, an extrusion molding method, a blow molding method, a press molding method, a vacuum molding method, or an expansion molding method through the use of a melt-kneaded product of the resin composition or a pellet obtained through the melting and kneading of the composition as a raw material. In particular, the molded article is preferably produced by the injection molding method or the injection compression molding method through the use of the pellet obtained through the melting and kneading.

The thickness of the molded article may be arbitrarily set in accordance with its applications. In particular, when the transparency of the molded article is required, the thickness is preferably from 0.2 mm to 4.0 mm, more preferably from 0.3 mm to 3.0 mm, still more preferably from 0.3 mm to 2.0 mm. When the thickness of the molded article is 0.2 mm or more, its warping does not occur and good mechanical strength is obtained. In addition, when the thickness of the molded article is 4.0 mm or less, high transparency is obtained.

In the method of producing a molded article, a coating film formed of a hard coating film, an antifogging film, an antistatic film, or an antireflection film may be formed on the molded article as required, and a composite coating film formed of two or more kinds thereof may be formed.

Among them, a coating film formed of a hard coating film is particularly preferably formed because the film has good weatherability and can prevent the wear of the surface of the molded article with time. A material for the hard coating film is not particularly limited, and a known material, such as an acrylate-based hard coating agent, a silicone-based hard coating agent, or an inorganic hard coating agent, may be used.

In the case of a molded article containing a glass filler, when at least part of the glass filler is present on the outermost surface of the molded article, the surface roughness of the molded article increases and the degree of irregular reflection at the surface of the molded article increases, and as a result, the transparency of the molded article may deteriorate. Therefore, for example, a method involving forming a layer containing a high proportion of the resin (skin layer) on the outermost surface of the molded article to reduce the surface roughness of the molded article is available as a method of reducing the surface roughness of the molded article. As a method of forming the skin layer, in the case of injection molding, when the temperature of a mold is set to a temperature higher than a general condition, the resin in contact with the mold easily flows, and hence the surface roughness of the outermost surface of the molded article can be reduced. In the case of compression molding, when a pressure at the time of the molding is set to a pressure higher than a general condition, the surface roughness of the outermost surface of the molded article can be reduced.

When the surface roughness of the molded article is reduced by using any such method, the irregular reflection at the surface of the molded article is suppressed, and hence the haze thereof reduces. As a result, the transparency of the molded article can be improved.

In the present invention, a molded article having a total light transmittance of 80% or more for visible light and/or a haze of 10 or less when molded into a flat plate having a thickness of 2 mm can be produced. In the present invention, a molded article having a total light transmittance of preferably 83% or more can be produced by changing the kinds and blending ratios of components to be blended. Similarly, a molded article having a haze of preferably 8 or less, more preferably 7 or less can be produced by changing the kinds and blending ratios of the components to be blended. When the haze falls within the range, transparency sufficient for a molded body can be secured. The molded article having the optical properties is excellent in transparency, and hence can be used in applications where high transparency is required.

A total light transmittance that is an optical property of a polycarbonate resin molded body is a value obtained from measurement performed on a sample having a thickness of 2 mm with NDH SENSOR manufactured by Nippon Denshoku Industries, Co., Ltd. in conformity with ASTM D1003. A haze value is a value obtained from measurement performed on the sample having a thickness of 2 mm with NDH SENSOR manufactured by Nippon Denshoku Industries, Co., Ltd. in conformity with ASTM D1003.

The molded article produced by the present invention can be suitably used in members that are each required to have transparency and rigidity, and further, scratch resistance and weatherability, such as: (1) automobile parts, such as a sunroof, a door visor, a rear window, and a side window; (2) building parts, such as a building glass, a soundproof wall, a car port, a sunroom, and gratings; (3) windows for railway vehicles and ships; (4) parts for electrical instruments, such as various parts for a television, a radio-cassette recorder, a video camera, a video tape recorder, an audio player, a DVD player, a telephone, a display, a computer, a register, a copying machine, a printer, a facsimile, and the like, and respective parts for outer plates and housings thereof, (5) parts for precision instruments, such as casings and covers for precision machines, such as a cellular phone, a PDA, a camera, a slide projector, a clock or a watch, an electronic calculator, a measuring instrument, and a display instrument; (6) agricultural parts, such as a plastic greenhouse and a greenhouse; and (7) furniture parts, such as a lighting cover, blinds, and interior tools.

EXAMPLES

Now, the present invention is described in more detail by way of Examples, but the present invention is by no means limited to these Examples.

Characteristic values in the respective examples were determined in accordance with the following procedures.

<Viscosity-Average Molecular Weight of Polycarbonate-Based Resin>

A viscosity-average molecular weight (Mv) was calculated from the following equation (Schnell's equation) by using a limiting viscosity [η] determined through the measurement of the viscosity of a methylene chloride solution (concentration: g/L) at 20° C. with an Ubbelohde-type viscometer.

$$[\eta]=1.23\times10^{-5}\times Mv^{0.83} \qquad \text{[Math. 2]}$$

<Refractive Indices of Resin and Resin Composition>

Refractive indices nC, nD, and nF at respective wavelengths were measured with an Abbe refractometer (MODEL 2010/M PRISM COUPLER manufactured by Metricon Corporation), and interference filters for wavelengths of 656.3 nm (C line), 589.3 nm (D line), and 486.1 nm (F line).

<Haze Value>

A haze value is a value obtained from measurement performed on the sample having a thickness of 2 mm with NDH SENSOR manufactured by Nippon Denshoku Industries, Co., Ltd. in conformity with ASTM D1003.

<Total Light Transmittance: Tt (%)>

The total light transmittance of a test piece having a thickness of 2 mm was measured in conformity with ASTM D1003. NDH 2000 manufactured by Nippon Denshoku Industries Co., Ltd. was used as a measuring apparatus.

Production Example 1: Production of Aliphatic PC-Based Resin (PC1)

111.7 g (0.765 mol) of isosorbide (ISB) and 60.6 g (0.42 mol) of 1,4-cyclohexanedimethanol (CHDM) serving as monomer raw materials, 269.64 g (1.26 mol) of diphenyl carbonate serving as a carbonic acid diester, 1.44 mL of a 15 wt % aqueous solution of tetramethylammonium hydroxide, and 24 µL of a 0.1 mol/L aqueous solution of sodium hydroxide were loaded into a reaction vessel including a stirring apparatus, a distiller, and a decompression apparatus. Air in the system was purged with nitrogen, and then the contents were melted at 140° C. After the mixture had been stirred for 30 minutes, while a temperature in the vessel was increased to 180° C., a pressure therein was gradually reduced, and the mixture was subjected to a reaction at 13.3 kPa for 30 minutes, followed by the removal of produced phenol by distillation.

Subsequently, while the pressure was maintained at the above-mentioned value, the temperature was continuously increased, and the resultant was subjected to a reaction at 190° C. for 30 minutes, at 200° C. for 30 minutes, at 210° C. for 30 minutes, and at 220° C. for 60 minutes, followed by the removal of phenol by distillation. The pressure was gradually reduced and set to 133 Pa or less at 220° C. After the state had been held for 30 minutes, a degree of vacuum in the vessel was further increased. After the degree of vacuum had reached 1 mmHg or less, the resultant was subjected to a reaction for 4 hours under stirring. After that, 16 µL of a toluene solution containing 10 vol % of butyl p-toluenesulfonate was added as a deactivator to the resultant, and then the mixture was stirred at 240° C. and 13.3 kPa for 20 minutes to provide a target aliphatic PC-based resin (PC1). The PC1 had a refractive index (nD) of 1.504 at a wavelength of 589.3 nm, a refractive index (nF) of 1.510 at a wavelength of 486.1 nm, and a refractive index (nC) of 1.501 at a wavelength of 656.3 nm.

Production Example 2: Production of Aliphatic PC-Based Resin (PC2)

Polymerization was performed under the same conditions as those of Production Example 1 except that 87.70 g (0.6 mol) of isosorbide (ISB) and 86.5 g (0.6 mol) of 1,4-cyclohexanedimethanol (CHDM) were used as monomer raw materials. The PC2 had a refractive index (nD) of 1.499 at a wavelength of 589.3 nm, a refractive index (nF) of 1.505 at a wavelength of 486.1 nm, and a refractive index (nC) of 1.497 at a wavelength of 656.3 nm.

Production Example 3: Production of Aliphatic PC-Based Resin (PC3)

Polymerization was performed under the same conditions as those of Production Example 1 except that the following materials were used as monomer raw materials: 105.2 g (0.72 mol) of isosorbide (ISB) was used, and 94.2 g (0.48 mol) of tricyclodecanedimethanol (TCDDM) was used instead of CHDM. The PC3 had a refractive index (nD) of 1.518 at a wavelength of 589.3 nm, a refractive index (nF) of 1.525 at a wavelength of 486.1 nm, and a refractive index (nC) of 1.516 at a wavelength of 656.3 nm.

Production Example 4: Production of Aliphatic PC-Based Resin (PC4)

Polymerization was performed under the same conditions as those of Production Example 1 except that the following materials were used as monomer raw materials: 122.8 g (0.84 mol) of isosorbide (ISB) was used, and 27.4 g (0.36 mol) of propane-1,2-diol (PG) was used instead of CHDM. The PC4 had a refractive index (nD) of 1.500 at a wavelength of 589.3 nm, a refractive index (nF) of 1.506 at a wavelength of 486.1 nm, and a refractive index (nC) of 1.496 at a wavelength of 656.3 nm.

<Aromatic Polycarbonate-Based Resin (B)>

Aromatic homopolycarbonate resin (B1) [manufactured by Idemitsu Kosan Co., Ltd., TARFLON FN2200 (product name), viscosity-average molecular weight=21,300, refractive index (nD) at a wavelength of 589.3 nm=1.588, refractive index (nF) at a wavelength of 486.1 nm=1.604, refractive index (nC) at a wavelength of 656.3 nm=1.578]

Aromatic Polyester-Based Resin (C)

Aromatic polyester-based resin (C1) [manufactured by Toyobo Co., Ltd., VYLOPET EMC-307, refractive index (nD) at a wavelength of 589.3 nm=1.576, refractive index (nF) at a wavelength of 486.1 nm=1.594, refractive index (nC) at a wavelength of 656.3 nm=1.570]

<Polyarylate Resin (D)>

Polyarylate resin (D1) [manufactured by Unitika Ltd., U-100, refractive index (nD) at a wavelength of 589.3 nm=1.610, refractive index (nF) at a wavelength of 486.1 nm=1.627, refractive index (nC) at a wavelength of 656.3 nm=1.603]

<Glass Filler (E)>

Glass filler (E1): S-2 GLASS FIBER [manufactured by Sakai Sangyo Co., Ltd., nD=1.510, nF (refractive index at a wavelength of 486.1 nm)=1.517, nC (refractive index at a wavelength of 656.3 nm)=1.508]

Glass filler (E2): T GLASS YARN [manufactured by Soyo Co., Ltd., nD=1.524, nF=1.531, nC=1.522]

Glass filler (E3): E glass [manufactured by Asahi Fiber Glass Co., Ltd., nD=1.556, nF=1.562, nC=1.552]

Example 1

The PC1 that was an aliphatic PC resin, the PC (B1) that was an aromatic PC resin, and cesium fluoride were sufficiently mixed at amount ratios shown in Table 1. After that, the mixture was melted and kneaded in a small kneader MC 15 (manufactured by RheoLab Ltd.) under the conditions of 240° C. and 5 minutes to produce a pellet of a polycarbonate-based resin composition. The resultant pellet was dried at 100° C. for 8 hours, and was then subjected to press molding with a vacuum heat press machine (IMC-11FD manufactured by Imoto Machinery Co., Ltd.) at 240° C. into a plate having a thickness of 2 mm, followed by the measurement of its haze. The results are shown in Table 1.

Examples 2 to 7, and Comparative Examples 1 to 3

Pellets and test pieces of polycarbonate-based resin compositions were each produced in the same manner as in Example 1 except that the kinds and amount ratios of the aliphatic PC resin, the aromatic thermoplastic resin, and the transesterification catalyst shown in Table 1 were changed as shown in the table. The results are similarly shown in Table 1.

TABLE 1

|  |  |  | Example | | | | | | | Comparative Example | | |
|---|---|---|---|---|---|---|---|---|---|---|---|---|
|  |  |  | 1 | 2 | 3 | 4 | 5 | 6 | 7 | 1 | 2 | 3 |
| Aliphatic PC-based resin | PC1 | mass % | 90 | 69 | 70 | 65 |  |  |  | 90 | 65 |  |
|  | PC2 |  |  |  |  |  | 88 |  |  |  |  | 88 |
|  | PC3 |  |  |  |  |  |  | 90 |  |  |  |  |
|  | PC4 |  |  |  |  |  |  |  | 82 |  |  |  |
| Aromatic PC-based resin (B1) |  |  | 10 | 31 | 13 |  |  | 10 | 18 | 10 |  |  |
| Aromatic PE-based resin (C1) |  |  |  |  |  |  | 12 |  |  |  |  | 12 |
| Polyarylate resin (D1) |  |  |  |  | 17 | 35 |  |  |  |  | 35 |  |
| Transesterification catalyst | Catalyst 1: CsF | ppm by mass | 10 | 20 | 10 | 10 |  | 5 |  | — | — | — |
|  | Catalyst 2: ZnO |  |  |  |  |  | 100 |  | 100 |  |  |  |
| Kneading temperature |  | ° C. | 240 | 240 | 270 | 270 | 270 | 270 | 270 | 240 | 270 | 270 |
| Kneading time |  | min | 5 | 5 | 5 | 5 | 5 | 5 | 5 | 5 | 5 | 5 |
| Transparency of kneaded mixture |  |  | Transparent | Transparent | Transparent | Transparent | Transparent | Transparent | Transparent | Opaque | Opaque | Opaque |
| Refractive index | nF 486.1 nm |  | 1.517 | 1.532 | 1.531 | 1.534 | 1.516 | 1.531 | 1.518 |  |  |  |
|  | nD 589.3 nm |  | 1.510 | 1.523 | 1.522 | 1.526 | 1.508 | 1.524 | 1.510 |  |  |  |
|  | nC 656.3 nm |  | 1.506 | 1.519 | 1.518 | 1.522 | 1.506 | 1.521 | 1.506 |  |  |  |

Example 8

The resin mixture obtained in Example 1 and the glass filler (E1) were sufficiently mixed at amount ratios shown in Table 2. After that, the mixture was melted and kneaded in a small kneader MC 15 (manufactured by RheoLab Ltd.) under the conditions of 240° C. and 5 minutes to produce a pellet of a polycarbonate-based resin composition.

The resultant pellet was dried at 100° C. for 8 hours, and was then subjected to press molding with a vacuum heat press machine (IMC-11FD manufactured by Imoto Machinery Co., Ltd.) at 240° C. to produce a plate having a thickness of 2 mm as a molded article. The haze value and total light transmittance of the resultant molded article were measured. The results are shown in Table 2.

Examples 9 to 14, and Reference Examples 1 and 2

Polycarbonate-based resin compositions were each produced in the same manner as in Example 8 except that the kinds and amount ratios of the resin mixture obtained in each of Examples described above and the glass filler were changed as shown in Table 2. The results are similarly shown in Table 2.

TABLE 2

|  |  |  | Example | | | | | | | Reference Example | |
|---|---|---|---|---|---|---|---|---|---|---|---|
|  |  |  | 8 | 9 | 10 | 11 | 12 | 13 | 14 | 1 | 2 |
| Resin mixture | Resin mixture of Example 1 | mass % | 90 |  |  |  |  |  |  |  |  |
|  | Resin mixture of Example 2 |  |  | 85 |  |  |  |  |  |  |  |
|  | Resin mixture of Example 3 |  |  |  | 80 |  |  |  |  |  |  |
|  | Resin mixture of Example 4 |  |  |  |  | 80 |  |  |  |  |  |
|  | Resin mixture of Example 5 |  |  |  |  |  | 80 |  |  |  |  |
|  | Resin mixture of Example 6 |  |  |  |  |  |  | 70 |  |  |  |
|  | Resin mixture of Example 7 |  |  |  |  |  |  |  | 80 |  |  |
|  | Resin mixture of Example 1 |  |  |  |  |  |  |  |  | 90 |  |
|  | Resin mixture of Example 2 |  |  |  |  |  |  |  |  |  | 90 |
| Glass filler (GF) | (E1) | mass % | 10 |  | 20 | 20 | 20 |  | 20 |  | 10 |
|  | (E2) |  |  | 15 |  |  |  | 30 |  |  |  |
|  | (E3) |  |  |  |  |  |  |  |  | 10 |  |
| Kneading temperature |  | ° C. | 240 | 240 | 270 | 270 | 270 | 270 | 270 | 240 | 240 |
| Kneading time |  | min | 5 | 5 | 5 | 5 | 5 | 5 | 5 | 5 | 5 |
| Refractive index (nD) of resin mixture |  |  | 1.510 | 1.523 | 1.522 | 1.526 | 1.508 | 1.524 | 1.510 | 1.510 | 1.523 |
| Refractive index (nD) of GF |  |  | 1.510 | 1.524 | 1.524 | 1.524 | 1.510 | 1.524 | 1.510 | 1.556 | 1.512 |
| Difference in nD value between resin and GF | nD (resin) − nD (GF) |  | 0.000 | −0.001 | −0.002 | 0.002 | −0.002 | 0.000 | 0.000 | −0.046 | 0.011 |
| Total light transmittance | 2 mmt |  | 90 | 89 | 88 | 90 | 90 | 87 | 91 | 65 | 85 |
| Haze of molded article | 2 mmt |  | 4.4 | 5.1 | 6.5 | 4.7 | 4.6 | 7.1 | 4.3 | 88.0 | 11.0 |

In all of Examples and Comparative Examples described above, a reagent manufactured by Tokyo Chemical Industry Co., Ltd. was used as cesium fluoride, and a reagent manufactured by Wako Pure Chemical Industries, Ltd. was used as zinc oxide.

It is found from the results of Table 1 that the polycarbonate-based resin compositions produced in Examples 1 to 7 are superior in transparency to those of Comparative Examples 1 to 5. It is found from the results of Table 2 that the production methods of Examples 8 to 14 each provide a molded article having a low haze value.

INDUSTRIAL APPLICABILITY

According to the present invention, the polycarbonate-based resin composition having the following feature can be produced: while the composition has the excellent properties of each of the aliphatic polycarbonate-based resin, and at least one kind of thermoplastic resin selected from the aromatic polycarbonate-based resin, the aromatic polyester-based resin, and the polyarylate resin, the composition maintains high transparency inherent in any such polycarbonate-based resin.

The invention claimed is:

1. A method of producing a polycarbonate-based resin composition, comprising mixing:
   an aliphatic polycarbonate-based resin (A) containing a repeating unit (A-1) represented by the following general formula (I); and
   at least one kind of aromatic thermoplastic resin (S) selected from the group consisting of an aromatic polycarbonate-based resin (B) containing a polycarbonate block formed of a repeating unit represented by the following general formula (II), and a polyarylate resin (D) having a structural unit represented by the following general formula (IV)
   in the presence of a catalytic quantity of transesterification catalyst at a temperature equal to or more than a temperature at which the resin components melt for 1 minute or more and 30 minutes or less,
   wherein the aliphatic polycarbonate-based resin (A) is mixed at 60 mass % or more and 95 mass % or less with respect to 100 mass % of a total of the aliphatic polycarbonate-based resin (A) and the aromatic thermoplastic resin (S):

(I)

wherein $X^1$ represents a divalent aliphatic hydrocarbon group having 2 to 20 carbon atoms, or a divalent alicyclic hydrocarbon group having 4 to 22 carbon atoms, and the divalent aliphatic hydrocarbon group and the divalent alicyclic hydrocarbon group may each contain at least one heteroatom selected from an oxygen atom, a nitrogen atom, and a sulfur atom, and/or at least one halogen atom selected from a fluorine atom, a chlorine atom, a bromine atom, and an iodine atom;

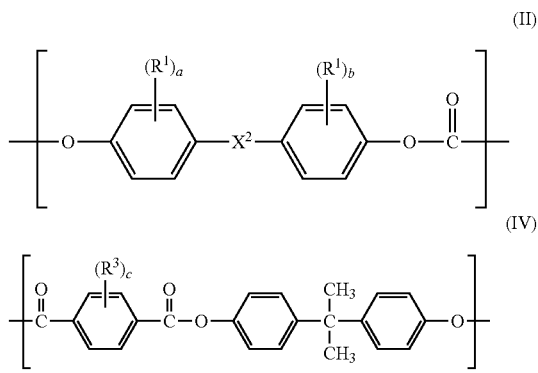

wherein $R^1$ and $R^2$ each independently represent a halogen atom, an alkyl group having 1 to 6 carbon atoms, or an alkoxy group having 1 to 6 carbon atoms, and a plurality of $R^1$s or $R^e$s may be identical to or different from each other, $X^2$ represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ is selected from the group consisting of a hydrogen atom, a halogen atom, a trifluoromethyl group, an alkyl group having 1 to 12 carbon atoms, a substituted or unsubstituted aryl group having 6 to 12 carbon atoms, an alkoxy group having 1 to 12 carbon atoms, and a substituted or unsubstituted aryloxy group having 6 to 12 carbon atoms, and a plurality of $R^3$s may be identical to or different from each other, and "a", "b", and "c" each independently represent an integer of from 0 to 4.

2. The method of producing a polycarbonate-based resin composition according to claim 1, wherein the aliphatic polycarbonate-based resin (A) contains, as the repeating unit (A-1), one or more selected from the group consisting of repeating units represented by the following general formulae (I-1), (I-2), and (I-3)

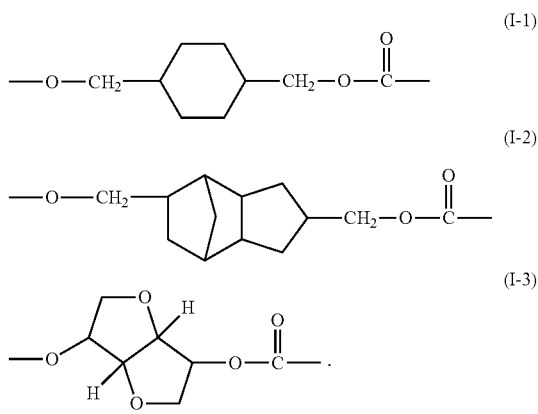

3. The method of producing a polycarbonate-based resin composition according to claim 2, wherein the aliphatic polycarbonate-based resin (A) contains, as the repeating unit (A-1), the repeating unit represented by the general formula (I-3).

4. The method of producing a polycarbonate-based resin composition according to claim 2, wherein a ratio of the repeating unit represented by the general formula (I-3) in the repeating unit (A-1) is 40 mol % or more.

5. The method of producing a polycarbonate-based resin composition according to claim 1, wherein the aromatic thermoplastic resin (S) is the aromatic polycarbonate-based resin (B) containing the polycarbonate block formed of the repeating unit represented by the general formula (II).

6. The method of producing a polycarbonate-based resin composition according to claim 1, wherein the transesterification catalyst comprises at least one kind selected from the group consisting of a metal oxide, an alkali metal compound, an alkaline earth metal compound, a nitrogen-containing compound, and a phosphorus-containing compound.

7. The method of producing a polycarbonate-based resin composition according to claim 1, wherein the polycarbonate-based resin composition has a refractive index of 1.50 or more and 1.55 or less for light having a wavelength of 589.3 nm.

8. The method of producing a polycarbonate-based resin composition according to claim 1, further comprising adding a glass filler (E) at a ratio of 5 mass % or more and 50 mass % or less in 100 mass % of a total amount of the polycarbonate-based resin composition.

9. The method of producing a polycarbonate-based resin composition according to claim 8, wherein the glass filler (E) comprises at least one kind selected from the group consisting of glass fibers, glass powder, a glass flake, milled fibers, a glass cloth, and glass beads.

10. The method of producing a polycarbonate-based resin composition according to claim 8, wherein the glass filler (E) has a refractive index of 1.50 or more and 1.55 or less for light having a wavelength of 589.3 nm.

11. The method of producing a polycarbonate-based resin composition according to claim 8, wherein a difference between a refractive index of a mixture of the aliphatic polycarbonate-based resin (A) and the aromatic thermoplastic resin (S) for light having a wavelength of 589.3 nm, and a refractive index of the glass filler (E) therefor is 0.020 or less.

12. A method of producing a molded article of a polycarbonate-based resin composition, comprising molding a polycarbonate-based resin composition obtained by the production method of claim 1.

13. The method of producing a molded article according to claim 12, wherein the molded article has a haze of 10 or less when produced to have a thickness of 2 mm.

14. The method of producing a molded article according to claim 13, wherein the molded article has a total light transmittance of 80% or more when produced to have a thickness of 2 mm.

* * * * *